United States Patent [19]

Izumi et al.

[11] 4,279,883
[45] Jul. 21, 1981

[54] PROCESS FOR PRODUCING HYDROGEN PEROXIDE

[75] Inventors: Yusuke Izumi, Shinnanyo; Hidetaka Miyazaki; Shin-ichi Kawahara, both of Tokuyama, all of Japan

[73] Assignee: Tokuyama Soda Kabushiki Kaisha, Yamaguchi, Japan

[21] Appl. No.: 747,214

[22] Filed: Dec. 3, 1976

[30] Foreign Application Priority Data

Dec. 10, 1975 [JP] Japan ................................. 50-146312

[51] Int. Cl.$^3$ ............................................. C01B 15/02
[52] U.S. Cl. ..................................................... 423/584
[58] Field of Search ............................................ 423/584

[56] References Cited

U.S. PATENT DOCUMENTS

| 3,361,533 | 1/1968 | Hooper ................................. 423/584 |
| 3,998,936 | 12/1976 | Ernst et al. ........................ 423/588 |
| 4,007,256 | 2/1977 | Kim et al. ............................. 423/584 |
| 4,009,252 | 2/1977 | Izumi et al. ......................... 423/584 |

FOREIGN PATENT DOCUMENTS 120045 10/1919 United Kingdom .................... 423/584

Primary Examiner—O. R. Vertiz
Assistant Examiner—Wayne A. Langel
Attorney, Agent, or Firm—Sherman & Shalloway

[57] ABSTRACT

In a process for preparing hydrogen peroxide by reacting hydrogen with oxygen in the presence of a catalyst in an aqueous medium containing hydrogen peroxide, the improvement which comprises using an aqueous medium which contains dissolved hydrogen and a platinum-group catalyst having adsorbed thereto hydrogen.

6 Claims, No Drawings

PROCESS FOR PRODUCING HYDROGEN PEROXIDE

FIELD OF THE INVENTION

This invention relates to a process for producing hydrogen peroxide directly from hydrogen and oxygen, and more specifically to a process for producing hydrogen peroxide by reacting hydrogen and oxygen in the presence of a catalyst in an aqueous medium containing hydrogen peroxide in which the activity of the catalyst is maintained to obtain hydrogen peroxide in high concentrations.

BACKGROUND OF THE INVENTION

Conventional industrial processes for preparing hydrogen peroxide generally include, for example, an electrolytic method using acidic ammonium sulfate, an autooxidation method using anthraquinones, and an oxidation method using isopropyl alcohol. On the other hand, various methods have been proposed for synthesizing hydrogen peroxide directly from hydrogen and oxygen.

A method has been known for preparing hydrogen peroxide by a catalytic reaction of hydrogen and oxygen generally at atmospheric pressure in an aqueous medium containing a platinum-group catalyst. According to this method, however, the resulting hydrogen peroxide further reacts with hydrogen to decompose to water, and the concentration of the hydrogen peroxide in the aqueous medium of the reaction system is as low as about 0.1% by weight (about 0.05 mole%). Accordingly, this method can hardly be expected to be commercially feasible.

In an attempt to overcome the above problem, a method has previously been proposed in which the reaction is carried out in the presence of a stabilizer for inhibiting the decomposition of hydrogen peroxide prepared from hydrogen and oxygen. As such a stabilizer, U.S. Pat. No. 3,361,533 discloses the use of an acid and a non-acidic oxygen-containing organic compound such as acetone or an alcohol, U.S. Pat. No. 3,336,112 discloses the use of a salt of condensed phosphoric acid, and Canadian Pat. No. 791,614 discloses the use of boric acid. The methods disclosed in these patents, however, afford hydrogen peroxide in a concentration of as low as less than about 3% by weight, and are therefore unsatisfactory.

The present inventors previously suggested in U.S. patent application Ser. No. 589,776 filed June 23, 1975, now U.S. Pat. No. 4,009,252 issued Feb. 22, 1977, a process for preparing hydrogen peroxide directly from hydrogen and oxygen which can afford hydrogen peroxide in high concentrations by using a combination of specific process conditions in the absence of a stabilizer. According to this process, the reaction is carried out in the presence of not more than 30 mg, per 100 ml of the aqueous medium, of a platinum-group catalyst calculated as the metal while maintaining the partial pressure of hydrogen and the partial pressure of oxygen in the gaseous phase of the reaction system at at least 0.5 atmosphere and at least 1.0 atmosphere respectively with the ratio of the partial pressure of oxygen to that of hydrogen adjusted to 1.5:1 to 20:1. This process successfully affords hydrogen peroxide in a concentration of as high as 12.8%. This prior application discloses that good results are obtained when the platinum-group catalyst is added to the aqueous medium after hydrogen has been introduced into the aqueous medium to adjust the partial pressure of hydrogen in the gaseous phase of the reaction system to at least 0.03 atmosphere.

U.S. Pat. No. 4,009,252 has furnished a superior process for obtaining hydrogen peroxide of high concentrations. It has been found however that when hydrogen peroxide is present in an amount above a certain limit in the aqueous medium or reaction mixture (for example, in the continuous process using the reaction mixture), the activity of the catalyst is reduced, and as a result, the concentration of the hydrogen peroxide decreases. This phenomenon begins to be perceptible when the amount of hydrogen peroxide present in the reaction mixture becomes at least 0.5% by weight, and develops to a considerable degree when the amount becomes 2% by weight or more. If the amount exceeds 5% by weight, the phenomenon becomes serious. Further investigation of this phenomenon led to the discovery that hydrogen peroxide present in advance to the reaction mixture exerts an undesirable action of reducing the activity of the catalyst to be added, but that hydrogen peroxide formed as a result of reaction and being present in the reaction mixture does not reduce the activity of the catalyst. For example, when an autoclave-type reactor is charged with an aqueous medium free from hydrogen peroxide, and then hydrogen and oxygen are introduced into the aqueous medium and reacted batchwise in the presence of a platinum-group catalyst, hydrogen peroxide is not present in the reaction mixture at the start of the reaction, but with the progress of the reaction, it is accumulated gradually in the reaction system. The activity of the catalyst is scarcely reduced by the hydrogen peroxide accumulated by reaction after the addition of the catalyst even when the concentration of hydrogen peroxide exceeds 5% by weight. In contrast, in a continuous process in which the reaction mixture is recycled, and a fresh supply of catalyst is added to the reaction system while recovering the resulting hydrogen peroxide and the spent catalyst, the hydrogen peroxide present in the reaction system before the addition of the catalyst acts on the catalyst freshly supplied to reduce its activity. The cause of this phenomenon has not yet been elucidated, but it is at least certain that this phenomenon becomes a serious drawback toward the preparation of hydrogen peroxide in high concentrations by the continuous process.

The present invention intends to solve the above-mentioned problem, and has for its object the provision of a novel process for preparing hydrogen peroxide directly from hydrogen and oxygen, which can afford hydrogen peroxide in high concentrations by preventing the reduction of the catalytic activity even when a detrimental amount of hydrogen peroxide is present in the aqueous medium. The process of the invention is especially suitable for continuously producing hydrogen peroxide in a concentration of as high as 5 to 13% by weight from hydrogen and oxygen.

SUMMARY OF THE INVENTION

The present invention provides an improved process for preparing hydrogen peroxide by reacting hydrogen and oxygen in the presence of a catalyst in an aqueous medium containing hydrogen peroxide, the improvement comprising using an aqueous medium which contains dissolved hydrogen and a platinum-group catalyst having adsorbed thereto hydrogen.

DETAILED DESCRIPTION OF THE INVENTION

It is essential in the present invention that firstly, where hydrogen peroxide is present in the aqueous medium, hydrogen be dissolved in the aqueous medium before the introduction of the catalyst to the aqueous medium and secondly, the catalyst to be used be a platinum-group catalyst having adsorbed thereto hydrogen. Sufficient effects cannot be obtained if only one of these requirement is met.

Hydrogen can be dissolved in the aqueous medium containing hydrogen peroxide by any known method. For example, a method in which hydrogen is caused to be present in the gaseous phase over the aqueous medium and then the aqueous medium is stirred, and a method in which hydrogen is blown directly into the aqueous medium can be employed preferably. The amount of hydrogen to be dissolved in the aqueous medium is not particularly critical, and may be small. When the amount of hydrogen dissolved is expressed in terms of the partial pressure of hydrogen in the gaseous phase contacting the aqueous medium in the reactor, the partial pressure of hydrogen is generally at least 0.001 atm., preferably at least 0.03 atm.

Preferably, the aqueous medium in which hydrogen is dissolved contains at least $10^{-5}$ N of at least one organic compound such as alcohols, and acids such as hydrochloric acid, sulfuric acid, various phosphoric acids, condensed phosphoric acid, nitric acid, hydrocyanic acid, hydrofluoric acid, hydrobromic acid, boric acid, heteropoly acids (e.g. silicomolybdic acid, silicotungetic acid, and phosphomolybdic acid), and organic acids. Or a salt containing an anion of such an acid may be caused to be copresent in a concentration of at least $10^{-5}$ N. Of these acids and anions, hydrochloric acid, hydrocyanic acid, a chlorine ion, and a cyanide ion are most preferably used. Other acids or anions are used preferably in combination with these.

It is further necessary that the catalyst to be used should have hydrogen adsorbed thereto. When these two requirements are met, there can be obtained an unexpected advantage that the catalyst used is free from reduction in activity even when hydrogen peroxide is present in the aqueous medium to which the catalyst is added. Probably, hydrogen adsorbed to the platinum-group catalyst and hydrogen dissolved in the aqueous medium act cooperatively to prevent the hydrogen peroxide present in the aqueous medium at the time of adding the catalyst from adversely affecting the catalyst added. There would be a minimum (this will be referred to in the present specification and claims as a "minimum effective amount") in the amount required of hydrogen to be adsorbed to the catalyst. However, because the minimum effective amount varies depending upon various reaction conditions, and the amount of hydrogen adsorbed to the catalyst is considerably difficult to measure correctly, it is difficult to exactly define the minimum effective amount of hydrogen adsorbed. Those skilled in the art, however, can easily know whether the catalyst has adsorbed thereto the minimum effective amount of hydrogen, by actually reacting hydrogen with oxygen and measuring the concentration of the resulting hydrogen peroxide. The upper limit of the amount of hydrogen adsorbed which is required to prevent the reduction of catalytic activity is not critical at all. Accordingly, the platinum-group catalyst that can be used in this invention has adsorbed thereto hydrogen in an amount ranging from the minimum effective amount to the saturated amount of adsorption. Generally, it is preferred that at least 0.1 hydrogen atom be adsorbed for each platinum-group metal atom. More preferably, at least 0.5 hydrogen atom is adsorbed for each platinum-group metal atom.

Various methods can be used to cause the platinum-group catalyst to adsorb hydrogen. Generally, the platinum-group metal catalyst is prepared by reducing a metallic ion of the platinum-group metal. When the reduction is carried out using hydrogen, hydrogen is adsorbed generally in an amount larger than the minimum effective amount. When such a catalyst is stored in an inert gas such as nitrogen or argon while avoiding contact with air, the adsorbed hydrogen remains unchanged in condition. Accordingly, the catalyst so stored can be used directly in this invention without further treating it for hydrogen adsorption. If desired, however, the catalyst so stored can be treated for further hydrogen adsorption. On the contrary, when the catalyst reduced with hydrogen is allowed to stand in the air, the hydrogen adsorbed combines with oxygen in the air by the catalytic action of the platinum-group metal to form water, and consequently the amount of hydrogen adsorbed becomes smaller than the minimum effective amount. Thus, the catalyst cannot be used in this invention unless treated for hydrogen adsorption. Platinum-group catalysts reduced with reducing agents which do not generate hydrogen, such as hydrazine, hydrogen sulfide, formaldehyde, sodium thiosulfate, and stannous chloride must be subjected to a hydrogen adsorbing treatment in order to make them feasible in the process of this invention.

Generally, the hydrogen adsorbing treatment is carried out by feeding hydrogen or a gaseous mixture of hydrogen and nitrogen to the platinum-group catalyst. Higher hydrogen pressures are preferred at this time, but too high pressures are commercially disadvantageous. On the other hand, no sufficient effect can be obtained at too low a pressure. Generally, the suitable pressure of hydrogen is 0.001 to 500 atms., preferably 0.01 to 200 atms. An inert gas such as nitrogen may be present at the time of this treatment. The temperature at which the adsorption is effected is not particularly limited, but can vary from a very low temperature of, say, $-150°$ C. to a high temperature of, say, 200° C. It is practical however to perform the treatment at room temperature or near it.

The hydrogen adsorbing treatment is carried out in the dried state, and the catalyst obtained is usually a powder. When such a powdery platinum-group catalyst is added directly to the reaction system, a complicated device is required for the addition, especially when the reaction is performed at high pressures. Generally, therefore, it is practical to suspend the catalyst in an aqueous medium, and supply the suspension by a pump or other suitable means. From this practical viewpoint, it is preferred that the hydrogen absorbing treatment be carried out in an aqueous medium, and the aqueous medium is directly fed into the reaction system. The aqueous medium may be water alone, but preferably, it is an aqueous solution containing hydrochloric acid and hydrocyanic acid. Preferably, no dissolved oxygen is present in the aqueous medium in which to perform the hydrogen adsorbing treatment, and for this purpose, it is preferred to blow an inert gas such as nitrogen or argon into the aqueous medium to remove oxygen from it. Water is preferably deionized water. According to preferred embodiments, an inert gas is blown into deionized water containing the above acid to remove dissolved oxygen, after which the platinum-group catalyst is put into it and the mixture is stirred while passing a hydrogen gas therethrough at a hydrogen partial pressure of 0.001 to 500 atms., preferably 0.01 to 200 atms., or a hydrogen gas is first dissolved in the deionized water, and then the platinum-group catalyst is put into it, followed by stirring the mixture, after which the suspension is directly fed into the reaction system.

When hydrogen adsorption is performed in the recycle aqueous medium in a continuous process comprising withdrawing the reaction mixture from the reaction system, separating the spent catalyst, distilling the residue to recover hydrogen peroxide formed, and then recycling the aqueous medium which contains a small amount of hydrogen peroxide to the reaction system, a suitable procedure is to cause hydrogen to be present in advance in the aqueous medium, then feed platinum-group catalyst or a powdery platinum-group catalyst having adsorbed hydrogen thereto, and feed the mixture with stirring into the reaction system.

The means for causing the platinum-group catalyst to adsorb hydrogen is not limited to the above methods, but any method which can substantially cause the adsorption of hydrogen to the catalyst can be employed as desired. An embodiment of performing hydrogen adsorption in aqueous media has the advantage of preventing the deterioration of the catalyst because the heat generated at the time of hydrogen adsorption is adsorbed by the aqueous medium. The general practice is to add the $H_2$-adsorbed catalyst to an aqueous medium having dissolved therein hydrogen. In a batchwise process, however, the aqueous medium containing dissolved hydrogen may be added to the $H_2$-adsorbed catalyst.

The platinum-group catalyst used in this invention may be platinum-group metals such as ruthenium, palladium or platinum, alloys of these metals, and alloys or mixtures of the platinum-group metals and other metals which are all known in the art. Palladium is most preferred among the platinum-group metals, and gold is especially preferred as the other metal. The catalyst may be used in colloidal form, but generally, it is used as supported on a carrier. Examples of usable carriers are silica gel, hydrous silicic acid, alumina gel, silica-alumina, titanium dioxide, zirconium dioxide, carbon, silicon carbide, diatomaceous earth, clay, and zeolite. Preferably, the carrier is used in a finely divided powder form. The hydrous silicic acid (usually called white carbon) is most conveniently used since it is a fine powder, and exerts no decomposing action on hydrogen peroxide. Silica gel can be used after being pulverized. Preferably, the carrier is treated with an acid such as hydrochloric acid and washed with water in order to remove iron contained in it.

One preferred method for supporting the platinum-metal on the carrier comprises dissolving a salt of the metal in, for example, hydrochloric acid, adding the carrier, evaporating the mixture to dryness at 30° to 200° C., then drying the residue at 30° to 500° C., preferably 50° to 400° C. in a stream of an inert gas such as nitrogen, and preferably further pulverizing the dried product. After this, the product is reduced at 50° to 500° C. by passing hydrogen gas. The reduced catalyst is stored in the air or in an inert gas such as nitrogen or argon so as to avoid contact with the air.

A so-called ion-exchange method or adsorption method can also be used at the time of supporting the platinum-group metal on the carrier.

The reducing treatment can be performed by using other reducing agents such as hydrazine, hydrogen sulfide, formaldehyde, sodium thiosulfate, and stannous chloride. Hydrogen is most preferred, however.

Generally, sufficient results can be obtained if the amount of the platinum-group catalyst having hydrogen adsorbed thereto is not more than 30 mm g, calculated as the metal, per 100 ml of the aqueous solution.

The partial pressure of hydrogen in the gaseous phase of the reaction system is generally at least 0.5 atm., and the partial pressure of oxygen is at least 1.0 atm. Preferably, the ratio of the partial pressure of oxygen to that of hydrogen is at least 1.2, more preferably 1.5–20.

Lower reaction temperatures give better results, and therefore, the reaction temperature is not more than 70° C., preferably not more than 15° C.

Hydrogen peroxide in high concentrations can be prepared by properly selecting the amount of the catalyst, the partial pressures of hydrogen and oxygen, the ratio of the partial pressure of oxygen to that of hydrogen, and the reaction temperature.

Furthermore, an embodiment is preferably employed in which an inert gas such as nitrogen is caused to be present in the gaseous phase of the reaction system in order to avoid an explosive limit.

When the process of this invention is performed continuously, an aqueous medium having the catalyst suspended in it and an aqueous solution containing an acid such as hydrochloric acid or phosphoric acid may be fed together or separately.

On the other hand, when the process of this invention is carried out batchwise, it is possible to use an aqueous medium which contains at least 0.5% by weight of hydrogen peroxide. The catalyst may be supplied additionally during the reaction.

The hydrogen used in this invention includes, for example, $H_2$, $D_2$, HP, and tritium, and should preferably be pure. Inclusion of small amounts of oxygen and nitrogen is permissible. Oxygen used is one obtained by compressing air, or one which is obtained by concentrating oxygen by a liquefying-separation method or adsorption-separation method and then compressing it.

Since the reaction in accordance with this invention is generally carried out at low temperatures, the corroding tendency of the reactor is comparatively reduced. Hence, the reactor can be built using a wide variety of acid-resistant materials. Examples of such materials are stainless steels, especially austenitic stainless steels, other metals such as tantalum, niobium, titanium and zirconium, ceramics, porcelains, glass, fluorine-containing resins such as polytetrafluoroethylene and polytrifluoroethylene, polyethylene, polypropylene, nylons, and polyethylene terephthalate. These materials may be lined in use, or a vessel made of an acid-resistant material may be fitted inside a pressure vessel made of a material that is not resistant to acids. A single reactor may be used or two or more reactors may be arranged in series to obtain hydrogen peroxide in progressively increasing concentrations. In the latter case, it is preferred that the catalyst be fed into a first reactor, and passed successively through second and subsequent reactors without separation, and recovered in the final reactor. Another method can also be employed. The heat of reaction can be removed by providing a heat exchanger in or outside the reactor.

The aqueous solution of hydrogen peroxide as formed by the reaction may be directly used as an oxidizing agent, or may be concentrated and purified by distillation after separating the catalyst. Alternatively, hydrochloric acid, phosphoric acid, and other impurities may be removed by using ion exchange resins, as described in Japanese Patent Publications Nos. 3816/53, 4221/56, 16677/60, and 3002/64. Especially when the reaction is carried out using water only without using an organic matter, water containing pure hydrogen peroxide in high concentrations can be obtained only by treatment with an anion-exchange resin. Hence, mere evaporation of water can afford commercially utilizable products.

The following Examples and Comparative Examples illustrate the present invention in greater detail. The catalysts used in these examples were prepared by the following method. The concentration of hydrogen peroxide and the amount of hydrogen adsorbed to the catalyst were measured by the following methods.

Method for preparation of catalyst

The catalyst used was a catalyst obtained by supporting 5% by weight of metallic palladium on a carrier of hydrous silicic acid. It was prepared in the following manner.

A fine powder of hydrous silicic acid (TOKUSIL GU, a tradename for a product of Tokuyama Soda Kabushiki Kaisha) was washed with conc. hydrochloric acid, washed with water, and dried. The hydrous silicic acid was added in a solution obtained by dissolving a predetermined amount of palladium chloride ($PdCl_2$, a product of Wako Jyunyaku Kogyo K.K.) in an aqueous solution of hydrochloric acid in an amount such that the amount of metallic palladium became 5% by weight based on the hydrous silicic acid. They were mixed with each other, and the mixture evaporated to dryness over a hot water bath. The residue was dried in a stream of nitrogen at 200° C. for 2 hours, and pulverized. The pulverized product was reduced at 200° C. for 2 hours in a stream of hydrogen at 1 atm., and then cooled to room temperature.

The catalyst so prepared was either stored in an inert gas immediately after cooling, and withdrawn from the inert gas just prior to use; or stored in the air after cooling, and subjected to a hydrogen absorbing treatment just prior to use.

The amounts of the catalysts shown in the examples mean the total amount of the carrier and palladium metal.

Method for measuring the concentration of hydrogen peroxide

Measured by a titration method using 0.1 N potassium permanganate in accordance with a customary manner.

Method for measuring the amount of hydrogen adsorbed to catalyst

The amount of hydrogen adsorbed to the catalyst stored in the air or an inert gas after reducing treatment was determined by contacting the catalyst with air at 250° C. and 1 atm. to react the hydrogen adsorbed to the catalyst with oxygen in the air and thus form water, measuring the amount of oxygen consumed in this reaction, and calculated from it the amount of hydrogen that has reacted with oxygen.

The amount of hydrogen adsorbed by the hydrogen adsorption treatment was obtained from the difference between the amount of hydrogen fed for the adsorption treatment and the amount of hydrogen recovered after the adsorption treatment.

EXAMPLE 1

A reaction was carried out continuously using a cylindrical reactor having a diameter of 10 cm and a height of 32 cm having a liquid zone with a volume of 2 liters and a gaseous zone with a volume of 0.5 liter. The reactor was equipped with a stirrer adapted to stir the gaseous zone and the liquid zone. First, the liquid zone was charged with 2 liters of deionized water containing 5% by weight of hydrogen peroxide, 0.035 N of hydrochloric acid and 0.03 N of phosphoric acid, and the gaseous zone was charged with a gaseous mixture of hydrogen at a partial pressure of 5 atms. and nitrogen at a partial pressure of 150 atms. Subsequently, the gaseous zone of the reactor was continuously charged with hydrogen gas and a gaseous mixture of oxygen and nitrogen so that the partial pressures of hydrogen, oxygen and nitrogen in the exhaust gas were maintained at 5 atms., 49 atms., and 113 atms., respectively. In the liquid zone of the reactor, an aqueous medium having suspended therein the separately prepared catalyst was passed at a rate of 200 ml/hour. During the passing of the gas and the catalyst suspension, the gaseous and liquid zones of the reactor were always stirred.

On the other hand, the reaction solution and exhaust gas were incessantly flowed out from the reactor. The catalyst was recovered together with the effluent without separating it at the exit of the reactor.

The catalyst suspension was prepared in the following manner. Hydrochloric acid and phosphoric acid were added to deionized water to a concentration of 0.035 N and 0.03 N respectively. The concentration of dissolved oxygen in the aqueous solution was reduced to 0 ppm by blowing nitrogen gas, and to this solution was added 1.6 g, per liter of the deionized water, of the palladium catalyst stored in the air. Then, for adsorption of hydrogen, a gaseous mixture of hydrogen under a partial pressure of 20 atms. and nitrogen under a pressure of 200 atms. was continuously passed through the suspension for 1 hour with stirring at room temperature. The catalyst suspension so prepared was fed into the reactor. The amount of hydrogen adsorbed to the catalyst stored in the air was 0.03 atm. per atom of palladium, and the amount of hydrogen adsorbed to the catalyst subjected to the hydrogen adsorbing treatment was 0.83 atom per atom of palladium.

When the reaction was continued for 200 hours at 5° C., a complete steady state was reached. The concentration of hydrogen peroxide in the effluent was 11.0% by weight.

When the above experiment was repeated except that deionized water having a pH of 6.1 was used instead of the aqueous solution containing hydrochloric acid and phosphoric acid, the concentration of hydrogen peroxide in the effluent was 7.2% by weight.

EXAMPLE 2

The experiment in Example 1 in which an aqueous solution containing hydrochloric acid and phosphoric acid was used as an aqueous medium was repeated except that the partial pressure of hydrogen in the preparation of the catalyst suspension was varied as shown in Table 1 below. The results are shown in Table 1.

TABLE 1

| Run No. | Partial pressure of hydrogen (atms.) | Concentration of hydrogen peroxide in the effluent (% by weight) | Amount of hydrogen adsorbed (H atoms/Pd atom) |
| --- | --- | --- | --- |
| 1 | 5 | 10.6 | 0.80 |
| 2 | 1 | 9.8 | 0.75 |
| 3 | 0.1 | 7.6 | 0.54 |

EXAMPLE 3

The experiment in Example 1 in which an aqueous solution containing hydrochloric acid and phosphoric acid was used as the aqueous medium was repeated except that the blowing of nitrogen gas in the preparation of the catalyst suspension to reduce the oxygen concentration in the aqueous medium to 0 ppm was omitted. Thus, in Example 3, as a result of contact with air at 1 atm., about 7 ppm of dissolved oxygen was present in the aqueous medium in the preparation of the catalyst suspension. The concentration of hydrogen peroxide in the effluent was 10.8% by weight.

COMPARATIVE EXAMPLE 1

The experiment in Example 1 in which an aqueous solution containing hydrochloric acid and phosphoric acid was used as the aqueous medium was repeated except that the hydrogen adsorbing treatment in the preparation of the catalyst suspension (i.e., the passing of the gaseous mixture of hydrogen under a partial pressure of 20 atms. and nitrogen under a partial pressure of 200 atms.) was omitted. The concentration of hydrogen peroxide in the effluent was 2.3% by weight.

COMPARATIVE EXAMPLE 2

Example 3 was repeated except that the hydrogen adsorption treatment in the preparation of the catalyst suspension was omitted. The concentration of hydrogen peroxide in the effluent was 2.1% by weight.

EXAMPLE 4

This Example shows an experiment in which a catalyst stored in a nitrogen gas after reduction with hydrogen (not subjected to a hydrogen adsorbing treatment in the aqueous medium) was used. The amount of hydrogen adsorbed to this catalyst was 0.72 atom per atom of palladium.

The experiment in Example 1 in which an aqueous solution containing hydrochloric acid and phosphoric acid was used as the aqueous medium was repeated except that the aforementioned catalyst stored in nitrogen was used instead of the palladium catalyst stored in the air, and the hydrogen absorption treatment in the preparation of the suspension of the catalyst (the passing of a gaseous mixture of hydrogen under a partial pressure of 20 atms. and nitrogen under a partial pressure of 200 atms.) was omitted. The concentration of hydrogen peroxide in the effluent was 8.5% by weight.

EXAMPLE 5

Example 4 was repeated except that the blowing of nitrogen gas to reduce the oxygen concentration of the aqueous medium to 0 ppm was omitted as in Example 3. The concentration of hydrogen peroxide in the effluent was 5.8% by weight.

EXAMPLE 6

This Example shows an experiment in which the palladium catalyst stored in nitrogen gas after reduction with hydrogen was used and the catalyst was subjected to a hydrogen adsorbing treatment in an aqueous medium.

The experiment in Example 1 in which an aqueous solution containing hydrochloric acid and phosphoric acid was used was repeated except that the catalyst stored in nitrogen was used instead of the palladium catalyst stored in the air. The concentration of hydrogen peroxide in the effluent was 11.3% by weight.

Example 7 and Comparative Examples 3 to 5 given below show that when a considerable amount of hydrogen peroxide is contained in an aqueous medium initially charged into the reactor in a batchwise process, the process of this invention can afford hydrogen peroxide in a high concentration without the reduction of the catalyst activity.

EXAMPLE 7

A 1.5-liter autoclave-type reactor equipped with a stirrer was first charged with 0.7 liter of an aqueous solution containing 0.035 N of hydrochloric acid, 0.03 N of phosphoric acid and 7.1% by weight of hydrogen peroxide, and then with stirring, a hydrogen gas under a pressure of 1 atm. was introduced. 300 ml. of a separately prepared suspension of catalyst was fed into the reactor with stirring. Then, the gaseous zone of the reactor was continuously charged with a hydrogen and a gaseous mixture of oxygen and nitrogen so that the partial pressures of hydrogen, oxygen and nitrogen in the exhaust gas from the reactor were maintained at 5 atms., 49 atms., and 113 atms., respectively. The reaction was carried out at 5° C. for 5 hours with continued stirring, to afford an aqueous solution containing 9.1% by weight of hydrogen peroxide.

The suspension of catalyst was prepared by the following method.

0.8 g of the palladium catalyst stored in the air was placed in 300 ml. of deionized water containing 0.035 N of hydrochloric acid and 0.03 N of phosphoric acid whose concentration of dissolved oxygen was reduced to 0 ppm by blowing nitrogen gas. A gaseous mixture of hydrogen under a partial pressure of 1 atm. and nitrogen under a partial pressure of 200 atms. was passed through the solution continuously for 1 hour, and the solution stirred.

COMPARATIVE EXAMPLE 3

Example 7 was repeated except that the aqueous solution initially charged into the autoclave-type reactor was 1 liter of deionized water containing 0.035 N of hydrochloric acid, 0.03 N of phosphoric acid, and 5.0% by weight of hydrogen peroxide, and 0.8 g of a solid supported catalyst stored in the air was used instead of the catalyst suspension. The reaction was performed at 5° C. for 5 hours with continued stirring. The concentration of hydrogen peroxide was 3.3% by weight.

COMPARATIVE EXAMPLE 4

Comparative Example 3 was repeated except that the introduction of hydrogen gas under 1 atm. prior to the feeding of the solid catalyst into the reactor was omitted. When the solution was stirred at 5° C. for 5 hours, the concentration of hydrogen peroxide in the reaction solution was 0.94% by weight.

COMPARATIVE EXAMPLE 5

Example 7 was repeated except that the aqueous solution initially charged into the autoclave-type reactor was 0.7 liter of deionized water containing 0.05 N of hydrochloric acid, 0.043 N of phosphoric acid and 7.1% by weight of hydrogen peroxide, and the introduction of hydrogen gas under 1 atm. prior to the feeding of the catalyst suspension into the reactor was omitted. When the solution was stirred at 5° C. for 5 hours, the concentration of hydrogen peroxide in the reaction solution was 0.98% by weight.

What we claim is:

1. A continuous process for preparing hydrogen peroxide by reacting hydrogen with oxygen in an aqueous medium containing a platinum-group catalyst which comprises:
   a. dissolving hydrogen into the aqueous medium in an amount such that the partial pressure of hydrogen in a gaseous phase contacting the aqueous medium is at least 0.001 atmospheres,
   b. adding platinum-group catalyst having adsorbed thereon hydrogen in an amount ranging from at least 0.1 hydrogen atom adsorbed per atom of the platinum-group metal to the saturated amount of adsorption to the aqueous medium containing hydrogen dissolved therein,
   c. introducing hydrogen and oxygen gas into the aqueous medium to form hydrogen peroxide,
   d. withdrawing aqueous medium containing hydrogen peroxide and spent catalyst,
   e. adding fresh platinum-group catalyst having adsorbed thereon hydrogen in an amount ranging from at least 0.1 hydrogen atom adsorbed per atom of the platinum-group metal to the saturated amount of adsorption to the withdrawn aqueous medium to replace the spent platinum-group catalyst,
   f. recycling the withdrawn aqueous medium to which the fresh catalyst has been added for further reaction.

2. The process of claim 1 wherein the amount of hydrogen dissolved in the aqueous medium is sufficient to provide a partial pressure of hydrogen of at least 0.03 atmospheres.

3. The process of claim 1 wherein the platinum-group catalyst is prepared by reduction with hydrogen and which has been stored in an inert gas while avoiding contact with air.

4. The process of claim 1 wherein the platinum-group catalyst is one having adsorbed hydrogen by contact with a hydrogen-containing gas.

5. The process according to claim 1 wherein the platinum-group catalyst contains at least 0.5 hydrogen atom adsorbed per atom of the platinum-group metal.

6. The process of claim 1 wherein the platinum-group catalyst is selected from the group consisting of ruthenium, palladium, and platinum or alloys or mixture of these metals.

* * * * *